United States Patent

Mandava

(10) Patent No.: US 8,819,858 B2
(45) Date of Patent: Aug. 26, 2014

(54) HARDWARE ACCESS AND MONITORING CONTROL

(71) Applicant: CA, Inc., Islandia, NY (US)

(72) Inventor: Srikanth Mandava, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/720,730

(22) Filed: Dec. 19, 2012

(65) Prior Publication Data

US 2013/0111569 A1    May 2, 2013

Related U.S. Application Data

(63) Continuation of application No. 12/132,045, filed on Jun. 3, 2008, now Pat. No. 8,341,729.

(51) Int. Cl.
G06F 1/26 (2006.01)
G06F 11/00 (2006.01)
G08B 13/00 (2006.01)
G08B 21/00 (2006.01)
G08B 29/00 (2006.01)

(52) U.S. Cl.
USPC .......... 726/34; 726/3; 726/4; 726/17; 726/35; 726/36; 710/8; 710/15; 710/16; 710/17

(58) Field of Classification Search
USPC .......... 726/3, 4, 17–20, 34–36; 710/8, 15–17
See application file for complete search history.

(56) References Cited

U.S. PATENT DOCUMENTS

| | | | |
|---|---|---|---|
| 2,770,690 A | 11/1956 | Sanders | |
| 5,952,920 A | 9/1999 | Braddick | |
| 6,032,257 A | 2/2000 | Olarig et al. | |
| 7,262,706 B2 * | 8/2007 | Yang et al. | 340/656 |
| 7,367,063 B1 | 4/2008 | O'Toole, Jr. et al. | |
| 7,397,363 B2 | 7/2008 | Joao | |
| 7,558,564 B2 | 7/2009 | Wesby | |
| 7,584,501 B2 | 9/2009 | Stancil | |
| 7,877,788 B1 * | 1/2011 | Topp et al. | 726/4 |
| 8,281,114 B2 * | 10/2012 | Linetsky | 713/2 |
| 2005/0138433 A1 | 6/2005 | Linetsky | |
| 2005/0182860 A1 | 8/2005 | Schneckenburger | |
| 2005/0257055 A1 | 11/2005 | Anderson | |
| 2005/0289359 A1 * | 12/2005 | Mori et al. | 713/193 |
| 2006/0143716 A1 | 6/2006 | Ikemoto | |
| 2007/0061566 A1 | 3/2007 | Bailey et al. | |
| 2007/0289012 A1 | 12/2007 | Baird | |

(Continued)

OTHER PUBLICATIONS

U.S. Appl. No. 12/132,045, Examiner Interview Summary mailed Aug. 9, 2012, 3 pgs.

(Continued)

*Primary Examiner* — Jeffrey Pwu
*Assistant Examiner* — Jayesh Jhaveri
(74) *Attorney, Agent, or Firm* — Schwegman Lundberg & Woessner, P.A.

(57) ABSTRACT

Various embodiments described and illustrated here include one or more of systems, methods, software, and data structures that may be used to implement policies for hardware access and monitoring control in concert with a premises security system that controls ingress and egress of a facility. One embodiment includes identifying when certain devices are removed or decoupled from a computer and preventing one or more users of that computer from leaving a facility within which the computer is located.

17 Claims, 4 Drawing Sheets

(56) References Cited

U.S. PATENT DOCUMENTS

2008/0083018 A1* 4/2008 Prokupets et al. .............. 726/4
2009/0089463 A1    4/2009 Iga
2009/0300717 A1   12/2009 Mandava

OTHER PUBLICATIONS

U.S. Appl. No. 12/132,045, Final Office Action mailed Aug. 4, 2011, 15 pgs.

U.S. Appl. No. 12/132,045, Non Final Office Action mailed Feb. 18, 2011, 20 pgs.

U.S. Appl. No. 12/132,045, Non Final Office Action mailed May 3, 2012, 13 pgs.

U.S. Appl. No. 12/132,045, Non Final Office Action mailed Dec. 8, 2011, 17 pgs.

U.S. Appl. No. 12/132,045, Notice of Allowance mailed Aug. 20, 2012, 7 pgs.

U.S. Appl. No. 12/132,045, Response filed Mar. 8, 2012 to Non Final Office Action mailed Dec. 8, 2011, 9 pgs.

U.S. Appl. No. 12/132,045, Response filed Aug. 2, 2012 to Non Final Office Action mailed May 3, 2012, 7 pgs.

U.S. Appl. No. 12/132,045, Response filed Nov. 4, 2011 to Final Office Action mailed Aug. 4, 2011, 7 pgs.

U.S. Appl. No. 12/132,045, Response filed Jun. 20, 2011 to Non Final Office Action mailed Feb. 18, 2011, 8 pgs.

* cited by examiner

HARDWARE ACCESS AND MONITORING CONTROL

RELATED APPLICATION

This application is related to and is a continuation application of application Ser. No. 12/132,045, filed Jun. 3, 2008, entitled "HARDWARE ACCESS AND MONITORING CONTROL", to which priority is claimed and the entirety of which is incorporated herein by reference.

BACKGROUND INFORMATION

Data security is an important issue for many companies that develop and maintain proprietary and confidential data in electronic form. Users of computers that have access to such data can typically connect any hardware they desire to their computers and use it. As a result, users may connect devices to their computers and copy data or provide others access the data. For example, a user may connect a wireless networking card to a computer and connect to an outside network to provide unauthorized access to systems and data. Though such actions may be caught by surveillance, there currently are no mechanisms to prevent such actions.

SUMMARY

One embodiment in the form of a method includes obtaining device property data from each device coupled to a system and determining if each device is a device authorized for use with the system. Such embodiments further include allowing only devices authorized for use with the system to be accessed by processes of the system.

Another embodiment includes maintaining a list of devices coupled to a computer and determining if each device in the list is communicatively coupled to the computer. Upon determining a device in the list is not physically coupled to the computer, such embodiments send a notice that the device is not communicatively coupled to the computer.

Some embodiments, in the form of a system, may include a system having a bus coupled to a network interface, a peripheral device, and a processor including an out-of-band controller. The out-of-band controller is operable when the system is turned off to receive a request from a requestor over the network interface to determine if the peripheral device is coupled to the bus and to request and receive, over the bus, property data from the peripheral device. The out-of-band controller further compares the property data to known property data of the peripheral device to confirm the peripheral device has expected properties and send data to the requestor, the data identifying if the peripheral device has the expected properties.

Another system embodiment includes a bus coupled to a memory and a processor. A device driver in such embodiments includes code operable on the processor to retrieve property data from a peripheral upon connection to the bus and determine if the peripheral device is authorized for use with the system. The device driver initializes a peripheral device if the peripheral device is authorized.

DETAILED DESCRIPTION

Various embodiments described and illustrated here include one or more of systems, methods, software, and data structures that may be used to implement policies for hardware access and monitoring control. Some embodiments may be implemented to limit devices which may be used with computing devices within an organization. These and other embodiments may also be used to monitor what hardware is connected to computers within an organization and to determine if and when hardware policies have been violated. Some embodiments may be operably interconnected with premises security systems to help prevent removal of hardware devices from a premises secured by such a system. These and other embodiments are described herein with reference to the drawings.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
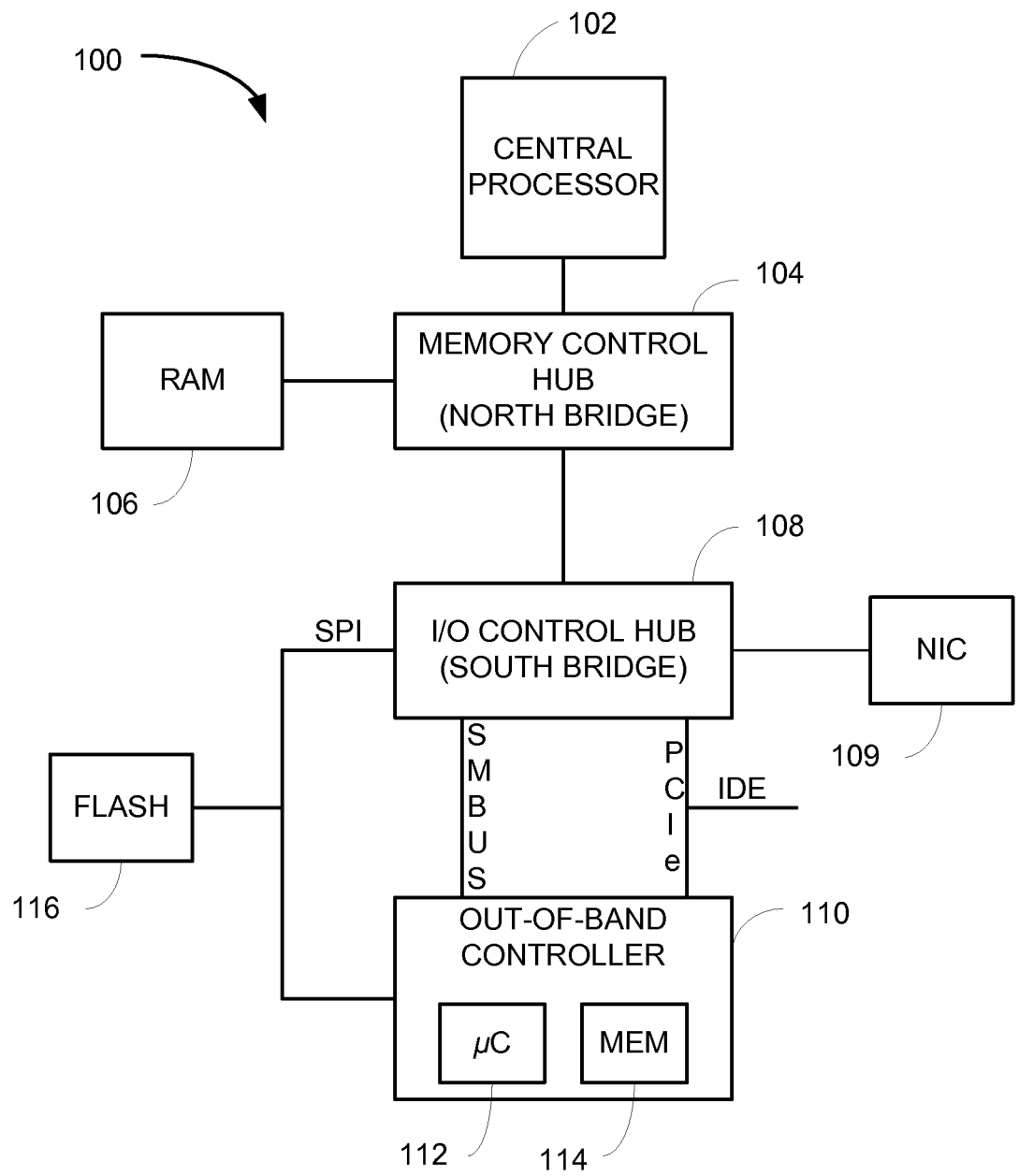
FIG. 1 is a logical schematic diagram of a system according to an example embodiment.

FIG. 1 is a logical schematic diagram of a system 100 according to an example embodiment. The example system 100 includes several interconnected components that provide a computing environment within which software may be executed. The components may include, without limitation, a central processor 102 and random access memory 106 coupled to a memory control hub 104. The memory control hub 104 is also coupled to an I/O control hub 108. Coupled to the I/O control hub 108 is a network interface 109, an out-of-band controller 110, and one or more memories including at least one non-volatile memory, such as a flash memory 116. Other memory and storage devices may also be coupled to the I/O control hub 108, such as one or more hard disk, floppy disk, writable optical disk, a Universal Serial Bus ("USB") controller which may optionally include a USB storage device, and other writable data storage devices. One or more display circuits, such as graphic cards or circuits may also be coupled to the I/O control hub 108.

The out-of-band controller 110 includes a microprocessor 112 and one or more memories 114 including one or more non-volatile memories. The out-of-band controller 110 may also be referred to as a manageability engine. The out-of-band controller 110 typically operates when a power source is available to the system 100. This includes even when the system 100 is powered off yet still plugged into a power source.

When a power supply is applied to the system 100, such as by plugging in a power cord of the system 100, the out-of-band controller 110 initializes. The initialization of the out-of-band controller 110 may include the out of band controller accessing an instruction set stored in a non-volatile memory, such as the flash memory 116 or a memory 114 within the out-of-band controller 110. The instruction set is executed by the microprocessor 112 to perform several functions. One such function may include initializing the network interface 109. The network interface 109 is typically a wired network interface device such as an Ethernet card or Ethernet circuit embedded in a board of the system 100. In some embodiments, the network interface 109 may be a wireless network interface, such as a WiFi or WiMax enabled wireless network interface device. Initializing the network interface 109 typically includes starting the network interface 109 and loading a network communication stack, such as a TCP/IP stack, to facilitate use of the network interface 109 by the out-of-band controller 110.

Another function facilitated by the out-of-band controller 110 instruction set is the ability to receive a request from a requestor over the network interface 109 to determine if one or more devices are coupled to the system 100. Such as request may originate with an administrator, a process of a premises security system that may be used to monitor and enforce security within a facility within which the system 100 is housed, or other logical or human user initiated process. The out-of-band controller 110 instruction set may then request and receive property data from one or more devices coupled to the system 100. The property data may include data identifying each device type and a serial number of each respective device. The property data may then be used by the out-of-band controller 110 instruction set to compare against stored property data of devices expected to be present within the system 100 to confirm that each device that is expected to be present is in fact present and the actual device expected based on the serial number or other data that is unique to a particular device. The instruction set of the out-of-band controller 110 may then send data to the requestor indicating whether or not all expected devices are present. The data sent to the requestor may also identify one or more of devices that are not present and devices that are present but not expected.

The system 100 may also include an instruction set stored in a data storage device coupled to the I/O control hub 108 or other portion of the system 100. The instruction set is typically loaded into the RAM 106 and executed by the central processor 102. The instruction set, in some embodiments, includes instructions executable on the central processor 102 to obtain property data from devices coupled to the system, such as the network interface 109, data storage devices coupled to the system 100 such as a hard disk or a USB storage device when connected, and other devices, such as Peripheral Component Interconnect ("PCI") type devices. The instruction set is further executable in such embodiments to determine if each device is a device authorized for use with the system 100 and/or by a user of the system 100. The instruction set may then allow or prevent use of individual devices based on the determination if each device is authorized for use. For example, the instruction set may prevent use of the network interface 109. In some embodiments, the instruction set may allow a limited set of functions to be performed with individual devices, such as allowing reads from a hard disk, but not allow writes to the hard disk.

Figure 2:
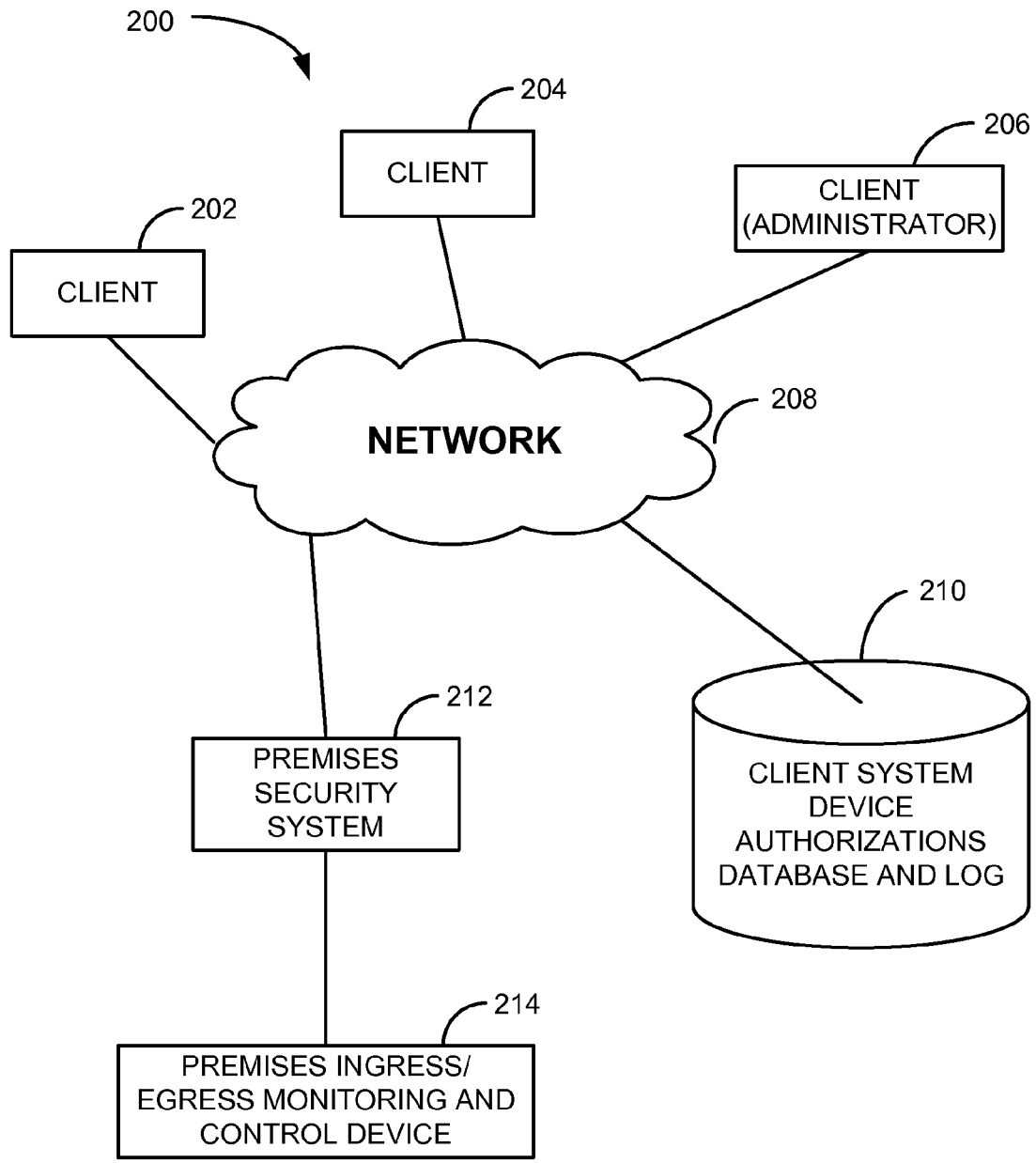
FIG. 2 is a logical block diagram of a networked system according to an example embodiment.

FIG. 2 is a logical block diagram of a networked system 200 according to an example embodiment. The system 200 includes clients 202, 204 and another client 206 of an administrator. The client 206, in various embodiments, may be a network administrator, system administrator, a manager of an employee using another of the clients 202, 204.

The clients 202, 204, 206 are coupled to a network 208. The network 208 may include one or more of a local area network, the Internet, a wide area network, a system area network. The network 208 typically includes wired connections, but may also include wireless connections.

In some embodiments, both client 202 and client 204 include a data structure identifying devices that are authorized for use on the respective clients 202, 204. This data structure may be locally stored on each client 202, 204 or may be retrieved from a network 208 storage location, such as a client system device authorizations database and log 210. In some embodiments, the data structure identifying authorized devices includes property data of each authorized or excluded device that may be used to identify particular devices. This property data may include a serial number of a device or other device property data that may be used to uniquely identify a device. The data structure may further include permission data associated with each device identified in the data structure. For example, the permission data may specify a device or devices of a certain type, such as USB storage devices, may not be allowed to operate with the client 202, 204. The permission data may alternatively authorize one or more of reading and writing data to a storage device, such as a hard disk, optical drive, or other storage device.

In some embodiments, the permissions of the data structure may be implemented by Basic Input-Output System ("BIOS") logic when the clients 202, 204 are started. In such embodiments, the BIOS may prevent unauthorized devices from being initialized. The BIOS may also redirect interrupts directed toward such devices to be redirected or ignored. In these, and other embodiments, the permissions of the data structure may also or alternatively be implemented by device drivers of devices identified in the permissions data structure. Such a device driver, when initializing a respective device, may query the data structure to obtain permission data relevant to the particular device. The driver may then prevent the device from being accessed if it is an unauthorized device. However, the device driver may also allow only certain types of actions. For example, if the permissions data identifies that the particular device may only be read from, all writes sent to the device may be ignored or an error returned.

In some embodiments, the BIOS, a device driver, or other software may also be operable upon demand, such as when a hot-pluggable device is added or removed from a client 202, 204. In such events, when a device is added or removed from a client 202, 204, the software determines if the device is allowed and if any limited permissions need to be enforced. The software may retrieve device property data, compare the property data against the permissions data structure, and implement the appropriate permissions.

In some embodiments, the permissions data structure may also, or alternatively, identify one or more devices which must be present in a client 202, 204. For example, a particular hard disk may be designated as a required device. In the event that a required device is found to be missing, the client 202, 204 may send a notice over the network 208 to the client 206 of the administrator or manager and/or to the client system device authorizations database and log 210 for tracking of such violations. A message may in some embodiments, such as in the event that a required device holds confidential, sensitive, secret, or other valuable data. However, in other embodiments, a message identifying a missing piece of required hardware may be sent to a premises security system 212 over the network.

The premises security system 212, in some embodiments, is a system used to help secure a facility, such as an office within which the clients 202, 204 are located. In the event that an item of hardware identified in the permissions data structure is determined to be missing, such as from client 202, the client 202 may send a message over the network 208 to the premises security system 212. The premises security system 212 may be aware of a user of the client 202 or the message may identify the user of the client 202. the premises security system 212 may then prevent the user from departing the office by preventing the user from passing through a premises ingress/egress monitoring and control device 214, such as a secured turnstile that may be activated by an access card or other ingress/egress control device.

In further embodiments, when a user, such as the user of the client 202, attempts to pass through the premises ingress/egress monitoring and control device 214 by swiping an access card, the premises security system 212 may identify the client 202 of the user swiping the access card. The premises security system may then query the client 202 over the network 208 to determine if all required hardware is present in the client 202. The client 202 may include an out-of-band controller 110 as illustrated and described with regard to FIG. 1 or may include other software to be responsive to such a query when the client 202 is powered on. If the hardware is present on the client 202, such a message may be returned to the premises security system 212 and the user is allowed to pass through the ingress/egress monitoring and control device. If the required hardware is not present, the user may be prevented from passing and further action may be taken by the premises security system 212, such as requesting for authorization form the client 206 of the manager or administrator or security personnel may called to attend to the identified situation.

Figure 3:
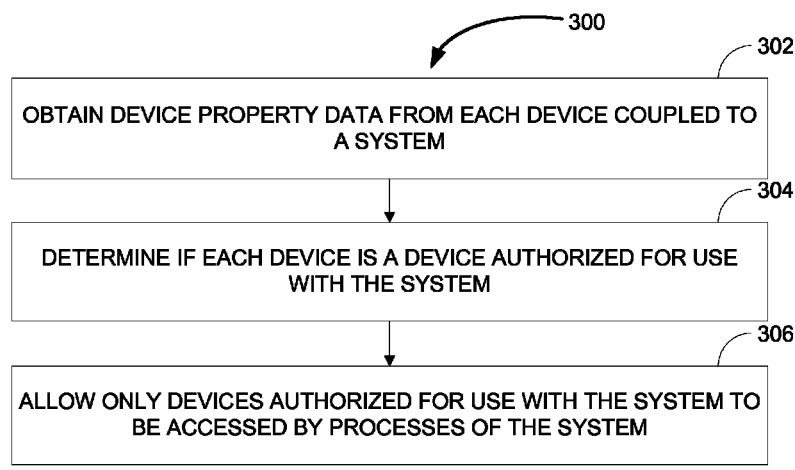
FIG. 3 is a block flow diagram of a method according to an example embodiment.

FIG. 3 is a block flow diagram of a method 300 according to an example embodiment. The method 300 is a method that may be used to implement limited peripheral device permissions within a computer, such as access permissions of a user to a hard disk or network interface card. The method 300 includes obtaining 302 device property data from each device coupled to a system and determining 304 if each device is a device authorized for use with the system. The method 300 further includes allowing 306 only devices authorized for use with the system to be accessed by processes of the system.

The method 300 may further include retrieving data identifying one or more devices authorized for use with the system for use in the determining 304. In such embodiments, the data identifying one or more devices authorized for use may be retrieved from a database, such as the client system device authorizations database and log 210 of FIG. 2 or other data storage location.

In some embodiments, allowing 306 only devices authorized for use with the system to be accessed by processes of the system includes allowing the processes of the system limited access to a particular device. For example, processes of the system may be able to read from a particular device, but prevented from writing to it. In other embodiments, a device may be written to but not read from. In further embodiments, such limited access includes allowing less than all of reading, writing, deleting, and updating data with regard to a particular device.

Further embodiments of the method 300 may include receiving a notification from a process of the system that a first device has been removed from communication with the system and sending a notice that the first device is no longer in communication with the system. Such a notice may be sent to a remote system and include data identifying the system and the first authorized device.

Obtaining 302 device property data from each device coupled to the system typically includes querying either the device directly or a repository of device data maintained by an operating system or virtual machine manager of the system. For example, if the device is a USB device, the device may be queried directly to obtain property information such as data identifying a vendor of the device, the type of device, a version of the device, and a serial number of the device. In an operating system environment, such as a Microsoft Windows operating system environment, various operating system application programming interface methods may be available to obtain such information. For example, a PCI_EXPRESS-_SERIAL_NUMBER capability call may be made within a Microsoft Windows environment to obtain the serial number of a PCI device. Other APIs may be present to obtain device property data depending on the particulars and computing environment of the particular embodiment.

Figure 4:
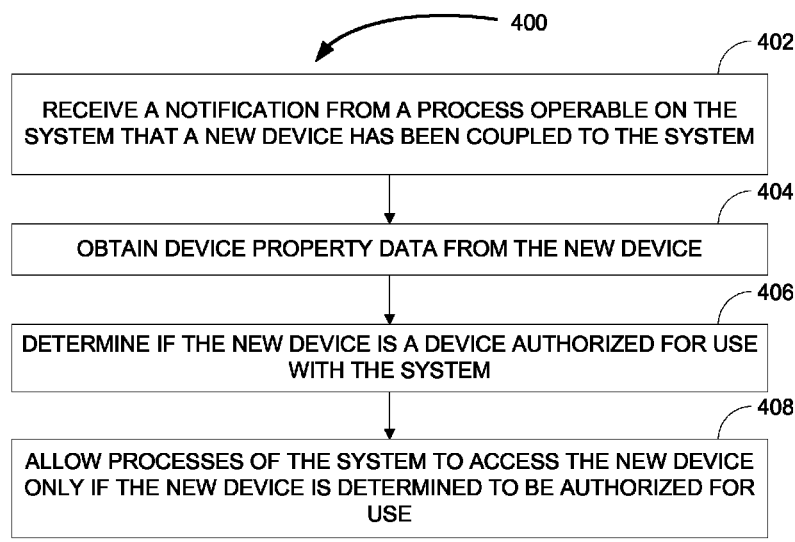
FIG. 4 is a block flow diagram of a method according to an example embodiment.

FIG. 4 is a block flow diagram of a method 400 according to an example embodiment. The method 400 is a method that may be implemented to enforce hardware access and monitoring control restrictions when a hot-pluggable device, such as a USB device, is added to a system when already booted. The method 400 includes receiving 402 a notification from a process operable on the system that a new device has been coupled to the system and obtaining 404 device property data from the new device. The method 400 further includes determining 406 if the new device is a device authorized for use with the system and allowing 408 processes of the system to access the new device only if the new device is determined to be authorized for use.

Figure 5:
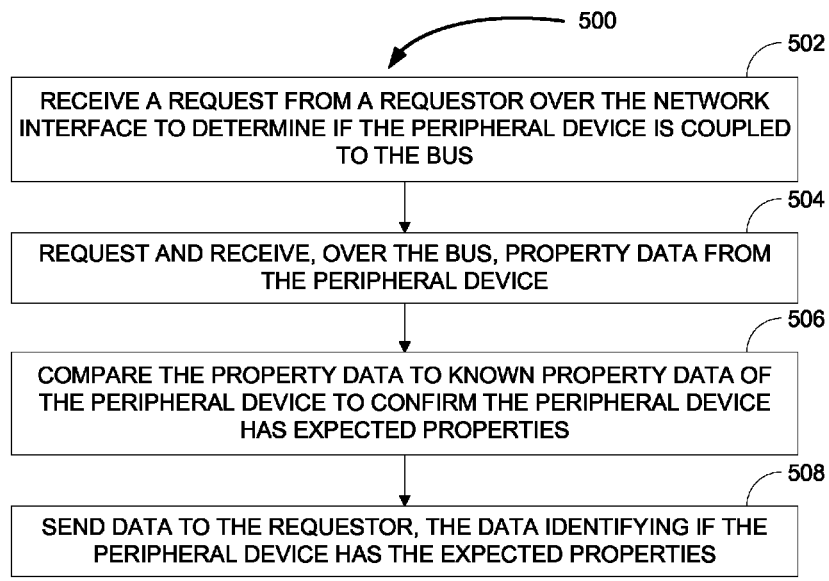
FIG. 5 is a block flow diagram of a method according to an example embodiment.

FIG. 5 is a block flow diagram of a method 500 according to an example embodiment. The method 500 may be performed by an out-of-band controller as described and illustrated with regard to FIG. 1 or by another portion of a computing device, such as a desktop computer. The method 500 includes receiving 502 a request from a requestor over the network interface to determine if the peripheral device is coupled to the bus. The received 502 request may be processed in some embodiments of the method by requesting and receiving 504, over the bus, property data from the peripheral device and comparing 506 the property data to known property data of the peripheral device to confirm the peripheral device has expected properties. The method 500 further includes sending 508 data to the requestor, the data identifying if the peripheral device has the expected properties.

In some embodiments, the known property data of the peripheral device is stored in a non-volatile memory coupled to the bus and accessible by an out-of-band controller or other processing element of a computing device implementing the method 500. The known property data of the peripheral device may include a serial number of the data storage device or other data that may be used to identify the peripheral device.

Figure 6:
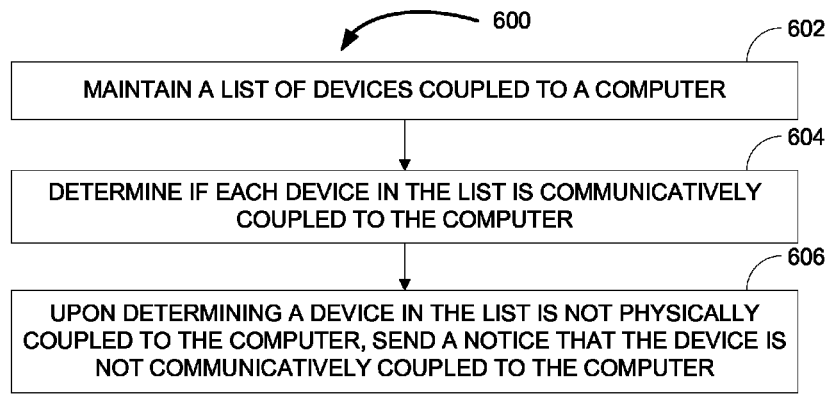
FIG. 6 is a block flow diagram of a method according to an example embodiment.

FIG. 6 is a block flow diagram of a method 600 according to an example embodiment. The method 600 includes maintaining 602 a list of devices coupled to a computer and determining 604 if each device in the list is communicatively coupled to the computer. Upon determining a device in the list is not physically coupled to the computer, the method 600 includes sending 606 a notice that the device is not communicatively coupled to the computer. The notice may be sent to a premises security system that controls ingress and egress from a premises. In some embodiments, the notice includes data identifying one or more users of the computer.

In some embodiments, the method 600 may further include receiving a request to determine if all devices included in the list of devices are communicatively coupled to the computer and send a response indicating if any devices in the list of devices are not communicatively coupled to the computer.

Other embodiments may include a peripheral device driver on a system, such as a system 100. The device driver in such embodiments is operable to retrieve property data from a peripheral device upon connection to the bus, such as at system startup or upon a hot-plug event. The device driver in such embodiments is further operable to determine if the peripheral device is authorized for use with the system and to initialize the peripheral device if it is authorized. In some embodiments, determining if the peripheral device is authorized includes determining if a serial number of the peripheral device included in the retrieved property data is included in a list of authorized peripheral devices stored in the memory. The list of authorized peripheral devices, in such embodiments, may identify authorized functions that may be performed with regard to the peripheral device. The authorized functions may include less than all of reading, writing, deleting, and updating data with regard to the peripheral device. In such embodiments, the device driver allows only authorized functions to be performed with regard to the peripheral device.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A non-transitory computer-readable medium, with instructions thereon that are executable by a computer to:
   maintain a list of devices coupled to a computer;
   when the computer is attached to a power source, but regardless of whether the computer is in a powered on state, determine if each device in the list is communicatively coupled to the computer; and
   upon determining a device in the list is not physically coupled to the computer, send a notice over a network via a network interface device of the computer to a premises security system that the device is not communicatively coupled to the computer, the premises security system controlling ingress and egress from a premises within which the computer is located, wherein the notice includes data identifying one or more users of the computer, the notice to cause the premises security system to prevent egress from the premises of at least the one or more users of the computer.

2. The non-transitory computer-readable medium of claim 1, wherein the device is a data storage device and the notice includes data identifying the data storage device.

3. The non-transitory computer-readable medium of claim 1, wherein the maintaining, determining and sending are performed by an out-of-band controller of the computer, the out-of-band controller is configured to operate when the computer is attached to the power source even when the computer is turned off.

4. The non-transitory computer-readable medium of claim 1, wherein the list of devices coupled to the computer includes at least one Peripheral Component Interface ("PCI") device.

5. The non-transitory computer-readable medium of claim 1, wherein the list of devices coupled to the computer includes at least one Universal Serial Bus ("USB") device.

6. The non-transitory computer-readable medium of claim 1, with further instructions stored thereon that are further executable by the computer to:
   receive an interrupt from a Basic Input-Output System ("BIOS") of the computer indicating a hot-pluggable device has been connected to or removed from the computer;
   obtain device identifying data of the hot-pluggable device;
   compare the device identifying data to permissions data of authorized devices to determine what permissions are allowed with regard to the hot-pluggable device; and
   implement the determined permissions.

7. The non-transitory computer-readable medium of claim 6, wherein a violation of an implemented permission triggers a sending of a second notice over the network via the network interface device of the computer to the premises security system, the second notice including data identifying the permission violation.

8. A method comprising:
   maintaining, in a memory of a computer, a list of devices coupled to the computer;
   when the computer is attached to a power source, but regardless of whether the computer is in a powered on state, determining if each device in the list is communicatively coupled to the computer, the determining including a controller of the computer requesting and receiving property data from devices coupled to the computer and the controller of the computer comparing the received property data with the list of devices coupled to the computer; and upon the controller determining a device in the list is not physically coupled to the computer, sending a notice over a network via a network interface device of the computer to a premises security system that the device is not communicatively coupled to the computer, the premises security system controlling ingress and egress from a premises within which the computer is located, wherein the notice includes data identifying one or more users of the computer, the notice to cause the premises security system to prevent egress from the premises of at least the one or more users of the computer.

9. The method of claim 8, wherein the device is a data storage device and the notice includes data identifying the data storage device.

10. The method of claim 8, wherein the method is performed by an out-of-band controller of the computer when the computer is turned off.

11. The method of claim 8, wherein the list of devices coupled to the computer includes at least one Peripheral Component Interface ("PCI") device.

12. The method of claim 8, wherein the list of devices coupled to the computer includes at least one Universal Serial Bus ("USB") device.

13. The method of claim 8, further comprising:
receiving an interrupt from a Basic Input-Output System ("BIOS") of the computer indicating a hot-pluggable device has been connected to or removed from the computer;
obtaining device identifying data of the hot-pluggable device;
comparing the device identifying data to permissions data of authorized devices to determine what permissions are allowed with regard to the hot-pluggable device; and
implementing the determined permissions.

14. The method of claim 13, wherein a violation of an implemented permission triggers a sending of a second notice over the network via the network interface device of the computer to the premises security system, the second notice including data identifying the permission violation.

15. A system comprising:
a bus;
a network interface device coupled to the bus;
a device coupled to the system;
a processor coupled to the bus and including an out-of-band controller, wherein the out-of-band controller is configured to operate when the system is attached to the power source even when the system is turned off to:
identify the device has been decoupled from the system;
access a stored list of devices coupled to the system, the stored list including permissions data with regard to at least one device indicating the at least one device is not to be decoupled from the system;
compare property data of the device decoupled from the system to the stored list of devices coupled to the system;
upon determining the device decoupled from the system is one of the at least one devices that is not to be decoupled from the system, send a notice over a network via the network interface device to a premises security system indicating the device has been decoupled from the system, the premises security system controlling ingress and egress from a premises within which the system is located, wherein the notice includes data identifying one or more users of the system, the notice to cause the premises security system to prevent egress from the premises of at least the one or more users of the system.

16. The system of claim 15, wherein the device is a data storage device and the notice includes data identifying the data storage device.

17. The system of claim 15, wherein the list of devices coupled to the computer includes at least one of a Peripheral Component Interface ("PCI") device and a Universal Serial Bus ("USB") device.

* * * * *